(12) United States Patent
Kuchta et al.

(10) Patent No.: US 6,549,310 B1
(45) Date of Patent: Apr. 15, 2003

(54) FIBER OPTIC DATA LINK MODULE WITH BUILT-IN LINK DIAGNOSTICS

(75) Inventors: Daniel M. Kuchta, Patterson, NY (US); Albert X. Widmer, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/227,519

(22) Filed: Jan. 8, 1999

(51) Int. Cl.[7] .............................................. H04B 10/08
(52) U.S. Cl. ...................... 359/110; 359/173; 359/185; 359/186; 359/187
(58) Field of Search ................................ 359/110, 187, 359/173, 185, 186

(56) References Cited

U.S. PATENT DOCUMENTS

| | | | |
|---|---|---|---|
| 4,471,494 A | * 9/1984 | Keil et al. .................. 455/611 |
| 5,382,785 A | 1/1995 | Rink | |
| 5,402,433 A | 3/1995 | Stiscia | |
| 5,448,629 A | * 9/1995 | Bosch et al. ................. 359/187 |
| 5,485,300 A | * 1/1996 | Daley ......................... 359/180 |
| 5,488,621 A | 1/1996 | Slawson et al. | |
| 5,515,361 A | 5/1996 | Li et al. | |
| 5,673,132 A | 9/1997 | Carbone, Jr. et al. | |
| 5,809,049 A | 9/1998 | Schaefer et al. | |
| 5,812,572 A | 9/1998 | King et al. | |
| 5,822,099 A | * 10/1998 | Takamatsu ................... 359/153 |
| 5,903,375 A | * 5/1999 | Horiuchi et al. ............. 359/177 |
| 5,965,876 A | * 10/1999 | Anemogiannis et al. ..... 250/227 |
| 6,188,498 B1 | * 2/2001 | Link et al. ................... 359/187 |

OTHER PUBLICATIONS

K. Suzuki, "Optical Time–Domain Reflectometer With a Semiconductor Laser Amplifier", Electronics Letters, Aug. 30, 1984, vol. 20.

* cited by examiner

Primary Examiner—Jason Chan
Assistant Examiner—Dzung Tran
(74) Attorney, Agent, or Firm—F. Chau & Associates, LLP

(57) ABSTRACT

A diagnostic system utilizes a monitor photodiode and a laser from a fiber optic data link transceiver to perform diagnostic measurements on the fiber optic data link. The diagnostic system includes a multiplexer connected between the encoder and the laser driver of the fiber optic data link. The multiplexer is controlled by a normal op/test mode selector and receives a pulse or pattern for the test mode from a pulse/pattern generator. A signal from the monitor photodiode flows into a pulse/pattern detection circuit which signals a register if a pattern is found. After a reflected pulse is detected, the register captures a count and forwards it to a service processor or system to be analyzed.

17 Claims, 2 Drawing Sheets

FIBER OPTIC DATA LINK MODULE WITH BUILT-IN LINK DIAGNOSTICS

BACKGROUND OF THE INVENTION

1. Field of the Invention

The present invention relates to the diagnostics of fiber optic data links and more particularly to utilizing an existing photodiode and laser for performing the diagnostics.

2. Description of the Prior Art

There are several techniques for monitoring fiber optic links. One such technique is described in U.S. Pat. No. 5,515,361 entitled "Link Monitoring And Management In Optical Star Networks" issued on May 7, 1996 and assigned to the same assignee as the present invention. This patent describes that when one link of a pair of links fails, the failure is detected by a monitor. When the pair of links again become operable, a signal is detected as passing from the transmitter through a loop and back to the receiver. U.S. Pat. No. 5,673,132 entitled "Apparatus For Repowering And Monitoring Serial Links", issued on Sep. 30, 1997 and assigned to the same assignee as the present invention, describes a computer system that employs a repeater unit that monitors and records non-idle usage and errors for both directions of a repeated serial link. The system can also send certain diagnostic patterns to assist with link determinations.

U.S. Pat. No. 5,488,621 entitled "Laser Bias And Modulation Circuit" issued on Jan. 30, 1996, and U.S. Pat. No. 5,402,433 entitled "Apparatus And Method For Laser Bias And Modulation Control" issued on Mar. 28, 1995, both describe systems for adjusting the bias current and the modulation current amplitude of the laser diode. The use of monitor photodiodes is included in the description.

An article entitled "Optical Time-domain Reflectometer With A Semiconductor Laser Amplifier" by K. Suzuki, T. Horiguchi and S. Seikai, Electronic Letters, Vol. 20, No. 18, pages 714–716, Aug. 30, 1984, describes using a semiconductor laser as an optical pulse generator and as a backscattered optical signal amplifier. The system receives analog backscatter data and uses digital signal processing to average and display the analog data. The system specifically avoids obtaining the reflected pulse from the end of the fiber by dipping the fiber end in index matching fluid. Also, the photodiode is not used to control the laser bias and the laser is not used for data communication. This system is also limited to longwave and single mode fiber.

It is an object of the present invention to provide a fiber optic data link diagnostic system that utilizes typical parts of an existing fiber optic transmitter system. It is a further object to provide a system that receives digital data (a reflected pulse) and uses digital signal processing to locate the reflected pulse.

SUMMARY OF THE INVENTION

The present invention utilizes a monitor photodiode and a laser to perform diagnostic measurements on a fiber optic data link. The monitor photodiode is typically part of the laser diode package and is normally used for monitoring the bias point of the laser. The laser is normally only used for transmitting data. The present invention receives digital data (a reflected pulse) and uses digital signal processing to locate the reflected pulse and to use the round trip time of the reflected pulse to determine a fault location or the link length.

The present invention includes a diagnostic system connected to a fiber optic transceiver. The diagnostic system includes a multiplexer connected between the encoder and the laser driver of the fiber optic data link transceiver. The multiplexer is controlled by a normal op/test mode selector which also enables a test controller. The multiplexer also receives a pulse or pattern for the test mode from a pulse/pattern generator. A signal from the monitor photodiode flows into a pulse/pattern detection circuit which signals the test controller and a register if a pattern is found. The test controller also controls a laser bias adjust circuit which modifies the inputs to the laser driver. The diagnostic system also includes a counter connected to the register which captures the count after a reflected pulse is detected and forwards the count to the service processor to be analyzed.

DETAILED DESCRIPTION OF THE INVENTION

Figure 1:
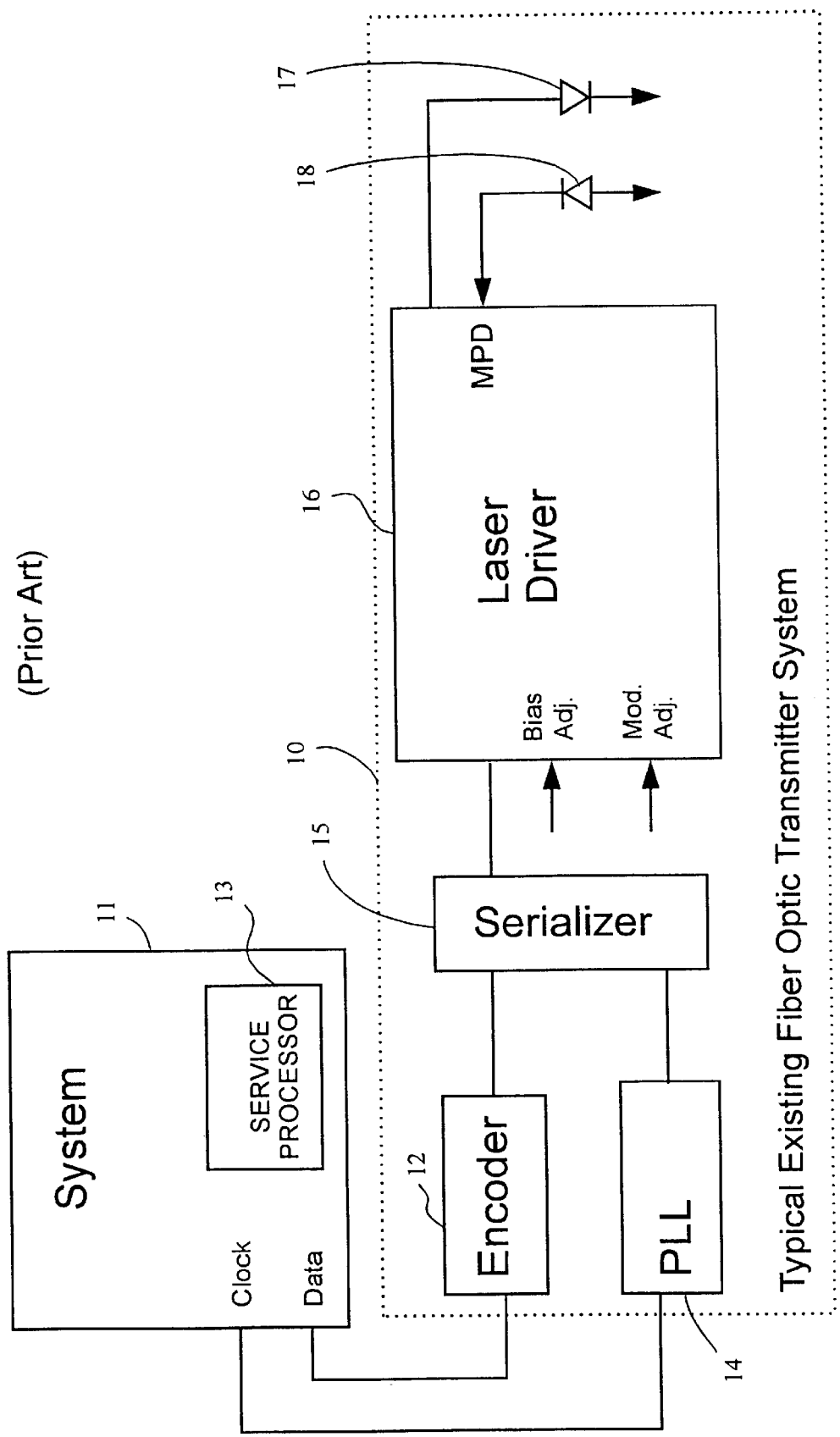
FIG. 1 illustrates a prior art fiber optic transmitter system.

FIG. 1 illustrates a prior art fiber optic transmitter system 10. A typical prior art serial fiber optic interface has a parallel source of data from system 11 (server, storage, disk drives, etc[18]) which is fed to encoder 12 as well as a clock signal which is fed into phase-locked loop (PLL) 14. The output of encoder 12 is parallel data which is serialized by serializer 15 and then fed into laser driver 16. The circuitry of laser driver 16 contains inputs for adjusting the modulation amplitude and bias current of laser diode 17, and possibly a third input which is a signal from monitor photodiode 18. System 11 includes service processor 13.

The monitor photodiode (MPD) used in prior art laser packages is physically a large area device with fairly large capacitance. This places limitations on the ability to do link diagnostics with very short pulses (~1 ns). One way around this limitation is to not use short pulses but to use longer pulses (~10 ns) or a pattern of data which imitates a long pulse. Another way around this limitation is to increase the bias on the photodiode. Yet another way (although perhaps more costly) is to use custom photodiodes that have higher bandwidth.

Figure 2:
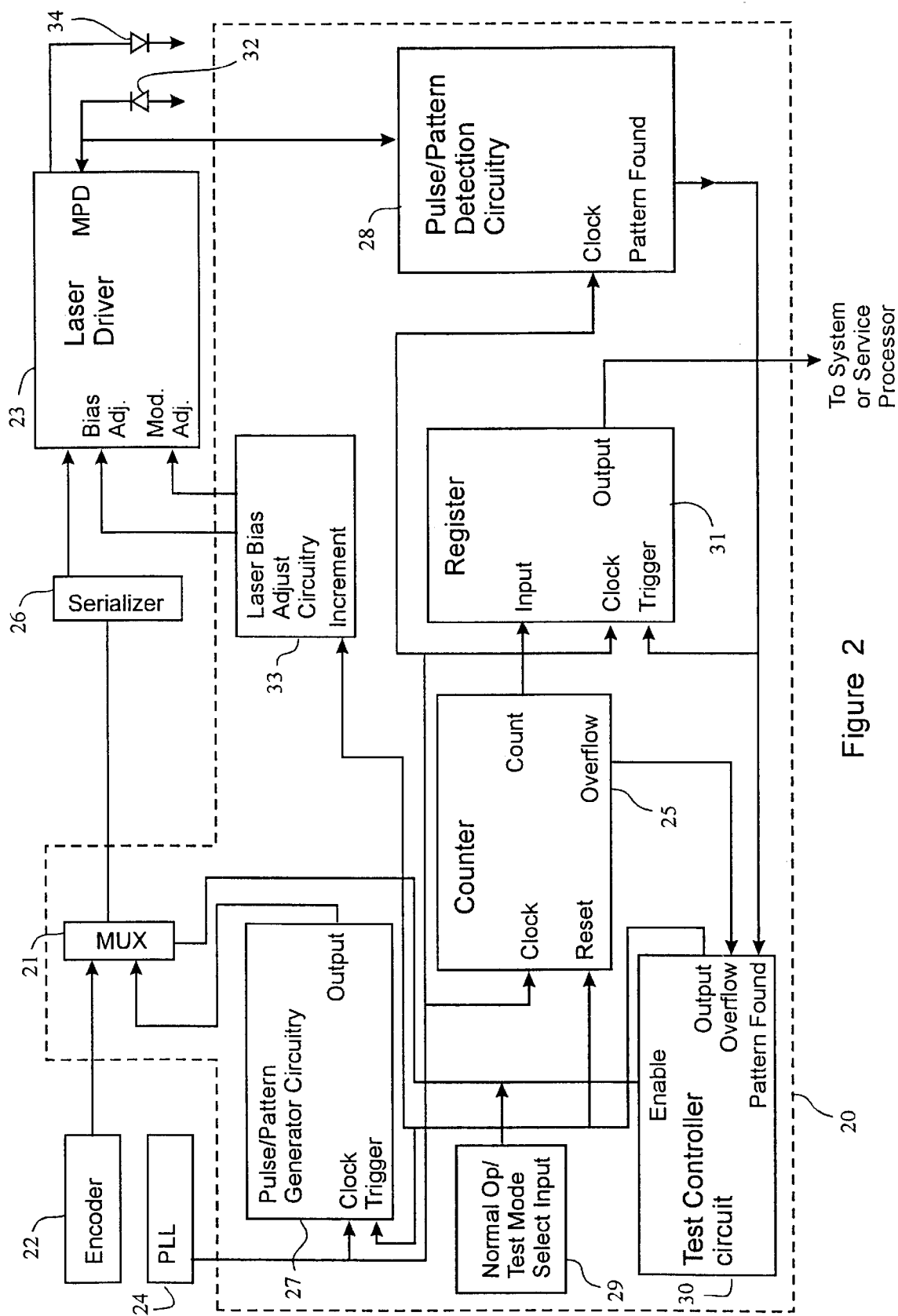
FIG. 2 illustrates a block diagram of the present invention.

As shown in FIG. 2, the present invention includes a modification to the above described fiber optic transmitter system. The modification is contained within diagnostic system 20. The first major addition is multiplexer 21 which is inserted between the coded data from encoder 22 and laser driver 23. In a preferred embodiment, as shown in FIG. 2, multiplexer 21 is inserted in a parallel path, however, multiplexer 21 could be inserted in a serial path between serializer 26 and laser driver 23. The output from phase-locked loop (PLL) 24, which is the system clock, is fed to counter 25, serializer 26, pulse/pattern generation circuit 27, register 31 and to pulse/pattern detection circuit 28.

Multiplexer 21 has two inputs. One input will be the coded data from encoder 22 and the other input is the output of pulse/pattern generator circuit 27. Multiplexer 21 receives a signal from normal op/test mode selector 29 which is either service processor 13 (FIG. 1) enabled or manually enabled to choose between coded data or a test mode. The manual enable provides that a technician on the machine room floor could use the test feature.

Pulse/pattern generator circuit 27 could be implemented as a one shot or in a preferred embodiment, would operate as a pattern generator providing a pattern with a low duty cycle stored in a memory device such as a ROM or EEPROM. For example, the one shot could produce a single ten nanosecond wide pulse or the pattern generator could produce ten ones followed by a large number of zeros. Pulse/pattern generator circuit 27 has two inputs. One input is the clock from PLL 24 and the other input is the trigger from test controller circuit 30. Pulse/pattern generator circuit 27 has a single output port to multiplexer 21 which is the pulse or pattern for the test mode. The output port of pulse/pattern generator circuit 27 may be one line or several lines in parallel.

Diagnostic system 20 also contains counter circuit 25. Counter circuit 25, in one embodiment, is a 16-bit counter and has the system clock as an input. Counter circuit 25 also has a system supplied reset which can also be the same signal as the trigger from test controller circuit 30 for pulse/pattern generator circuit 27. The actual number of bits in counter 25 can be chosen according to the maximum expected link length. The output of counter circuit 25 is the 16-bit count and an overflow signal. The overflow signal will indicate that a reflected pulse was not detected.

The 16-bit output of counter circuit 25 is fed to register 31. The purpose of register 31 is to capture the count after the reflected pulse is detected and send it back to service processor (13 of FIG. 1) to be analyzed. Register 31 has the 16-bit count as one input, a trigger as a second input and the system clock as a third input. The trigger for register 31 will come from pulse/pattern detection circuit 28. The purpose of the clock input is to serialize the count and send it out of register 31 to system 11 (FIG. 1) or service processor 13 (FIG. 1).

There are several options for dealing with the count. One option is to convert the count from a time to a distance in software. Another option is to convert the count to a distance in hardware. A third option is to have an LED indicator on a module card which could be observed by an operator/technician.

The method for converting the count to a distance is fairly straightforward. The count times twice the bit width (1 ns in this example) or the clock period is equal to the round-trip time that the pulse travels. The round-trip time divided by two and again divided by five will give the distance to the fault in meters. The factor of five comes from the fact that in an optical fiber, light travels one meter in approximately five nanoseconds. The factor of two is derived from the fact that the round-trip time is the time for twice the distance to the fault. The factor of five can be refined to improve the accuracy if desired. In practice, pulse/pattern detection circuit 28 may be afflicted with significant delay which must be taken into account for the calculation of the round trip time.

The signal from monitor photodiode (MPD) 32, besides going to laser driver 23, also flows into pulse/pattern detection circuit 28. Pulse pattern detection circuit 28 can be optionally AC or DC coupled. An optional switch (not shown) could be used to disconnect photodiode 32 from its normal feedback loop (low bandwidth) and to provide a 'dummy' current in its place. The front-end of the pulse detection circuit 28 is a high-speed amplifier chain to boost the received signal. Once the received signal has sufficient amplitude, some digital signal processing is necessary to detect the received pulse. In one embodiment, the digital signal processing could be implemented by an A/D converter which converts the received signal to a digital format which can then be processed in a number of ways. One way to process this signal is to average the signal over a number of bits and look for a change in the average. The output of pulse/pattern detection circuit 28 is used to trigger the count register 31 and update test controller circuit 30.

In another embodiment, diagnostic system 20 of the present invention could include a multiplexer (not shown) at the output of the transceiver's receiver chain. This multiplexer selects between the receiver decoded data and the count output from the counter register 31. The selector for this multiplexer is also tied to normal op/test mode selector 29 for the transmit multiplexer 21 which selects between normal and the test mode.

The inputs to laser driver circuitry 23 must also be modified by diagnostic system 20. The modulation adjust input for adjusting the modulation amplitude of laser diode 34 can be either left as it is set for normal operation or it can be increased to a maximum value. The input to the bias for laser diode 34 must be adjusted by laser bias adjust circuitry 33 since the biasing of the laser is very important to the overall operation of the test mode. The input of bias control circuitry 33 could be two preset potentiometers which service processor 13 (FIG. 1) selects between. (The potentiometers could be preset during manufacturing adjustment tests.) In another embodiment, these potentiometers could be replaced with a D/A converter or an electronic switch could be used which would switch between one potentiometer and a D/A converter. In such an embodiment, using a D/A converter, a subsystem would be required to start the laser bias at a low level, below threshold, and gradually increment the bias current until a new level is found where the return pulses can be detected. The return pulse is normally detected before the 16 bit counter overflows, however, an upper limit must be set on the laser bias current at which point, if no return pulse is found, then the fiber link is either not broken or a non-fiber related problem exist. The particular method of gradually incrementing the bias until the received pulse is detected is useful for systems that use edge emitting lasers. For systems that use surface emitting lasers, this method could be bypassed by simply turning off the laser bias after the pulse and letting the monitor photodiode for the surface emitting laser package pick up the reflected light. In still another embodiment, the bias input for the laser driver circuitry is replaced by a D/A converter with a logic circuit which selects between a normal and test mode.

Test controller circuit 30 is a logic block which performs several functions. After the system 11 (FIG. 1) switches from normal operation to test mode through normal op/test mode selector 29, test controller circuit 30 generates an initial trigger to reset counter 25, reset laser bias adjust circuitry 33, and trigger pulse/pattern generator 27. Test controller 30 must also monitor the count overflow from counter 25 and 'Pattern Found' signals from pulse/pattern detection circuitry 28. Test controller 30 also sends a signal to increment the bias and perform one of the following: try again (no pulse found); repeat the test again at the current conditions (pulse found, loop several times to obtain consistent results); or abort testing (no pulse found, laser bias incremented over entire range).

The operation of the present invention is as follows: Diagnostic system 20 initiates when the system 11 (FIG. 1) which is transmitting data from one point to another detects that it is no longer receiving data correctly or at all. At this determination, system 11 or service processor 13 (FIG. 1) activate diagnostic system 20 by raising the test mode select input, normal op/test mode selector 29, to a high or enabled voltage. When the test mode select input is enabled, a trigger pulse from test controller circuit 30 is generated which triggers pulse/pattern generator 27 to produce a pulse or a pattern and also resets counter 25 to begin counting. At the same time, the laser bias subsystem 33 changes the laser bias to a predetermined low level and begins the process of gradually incrementing the bias until a received pulse is detected. In laser bias subsystem 33, the time between current increments is predetermined to be slightly longer than twice the longest fiber optic link permitted. This will allow enough time for the received pulse to be returned before the current is incremented again. In a preferred embodiment, the overflow signal from counter 25 is used to tell the laser bias subsystem 33 to increment one more time. When a received pulse is detected, a hold signal is also sent to laser bias control subsystem 33 to halt the incrementing process and hold at the current or existing bias level. In conjunction with the increment signal or, in another embodiment, the lack of an overflow from counter 25 could be used as an indication to stop incrementing the laser bias and hold at the current or existing bias level.

Pulse/pattern detection subsystem 28 with its digital signal processing, monitors the received signal and looks for the received pulse/pattern. When the received pulse or pattern is correctly detected, pulse/pattern detection subsystem 28 sends a trigger to counter register 31 which then captures the current count and returns it to service processor 13 (FIG. 1) for conversion to distance or sends it to a hardware conversion circuit which then sends it back to service processor 13 (FIG. 1). The service processor then generates an error report for an operator/technician. Diagnostic system 20 remains active for several test cycles to ensure that there is a consistent report.

In addition to performing link diagnostics on a broken or failed link, the diagnostic system of the present invention could also be used in other ways. One such way would be to determine the length of a working link and to adjust the laser's transmitted power in a certain way to increase the reliability of the link. Examples of this are the following: If the link is determined to be a long link (i.e. greater than 300 meters) then the laser power could be increased to overcome length dependent power penalties (such as dispersion) and maintain a desired system margin. If the link is determined to be a short link (less than 50 meters) then the laser power could be reduced to increase the lifetime of the laser and to reduce the amount of jitter introduced by the receiver. (Receivers tend to introduce more jitter when the received power level is high and close to their saturation range.)

It is not intended that this invention be limited to the hardware or software arrangement, or operational procedures shown disclosed. This invention includes all of the alterations and variations thereto as encompassed within the scope of the claims as follows.

What is claimed is:

1. A fiber optic data link module with built-in link diagnostics, comprising:
    a diagnostic system that uses signals from a laser diode and a monitor photodiode of a fiber optic transmitter system to perform diagnostics of said fiber optic transmitter system by receiving digital data and by performing processing to detect a reflected test signal and to compute a roundtrip time of the reflected test signal to determine one of a fault location and link length,
    wherein said diagnostic system comprises:
        a multiplexer capable of connecting between an encoder and a serializer of said fiber optic transmitter system;
        a counter capable of connecting to a phase locked loop of said fiber optic transmitter system;
        a pulse/pattern generator connected to said multiplexer;
        a normal op/test mode selector connected to said multiplexer;
        a test controller connected to said normal op/test mode selector, said counter and said pulse/pattern generator;
        a register connected to said counter; and
        a pulse/pattern detector connected to said test controller and capable of connecting to said phase locked loop and said monitor photodiode of said fiber optic transmitter system.

2. A fiber optic data link module with built-in link diagnostics as claimed in claim 1 wherein said diagnostic system further comprises:
    a laser bias adjuster connected to said test controller and capable of connecting to said laser driver of said fiber optic transmitter system.

3. A fiber optic data link module with built-in link diagnostics as claimed in claim 2 wherein said laser bias adjuster comprises:
    a potentiometer;
    a digital to analog converter; and
    a switch for switching between said potentiometer and said digital to analog converter.

4. A fiber optic data link module with built-in link diagnostics as claimed in claim 2 wherein said test controller comprises:
    generation means for generating an initial trigger to reset said counter;
    reset means for resetting said laser bias adjuster;
    trigger means for triggering said pulse/pattern generator;
    first monitor means for monitoring a count overflow from said counter;
    second monitor means for monitoring a pattern found signal from pulse/pattern detection circuitry; and
    signal means for sending a signal for incrementing bias to said laser bias adjuster.

5. A fiber optic data link module with built-in link diagnostics as claimed in claim 1 wherein said normal op/test mode selector is enabled by a service processor.

6. A fiber optic data link module with built-in link diagnostics as claimed in claim 1 wherein said pulse/pattern generator comprises:
    pattern means for providing a pattern with a low duty cycle; and
    a memory device for storing said pattern; wherein said pulse/pattern generator provides a pulse or pattern for a test mode to said multiplexer.

7. A fiber optic data link module with built-in link diagnostics as claimed in claim 1 wherein said register comprises:
    capture means for capturing a count after a reflected pulse is detected; and
    transmit means for sending said count to a service processor to be analyzed.

8. A fiber optic data link module with built-in link diagnostics as claimed in claim 7 wherein said register further comprises:
    conversion means for converting said count from a time to a distance.

9. A fiber optic data link module with built-in link diagnostics as claimed in claim 1 wherein said diagnostic system further comprises:
    a switch located between said monitor photodiode and said laser driver.

10. A fiber optic data link module with built-in link diagnostics as claimed in claim 1 wherein said pulse/pattern detector comprises:

a front end amplifier for boosting a signal from said monitor photodiode; and a digital signal processor to detect a received pulse/pattern;

wherein an output of said pulse/pattern detector is used to trigger said register and update said test controller.

11. A fiber optic data link module with built-in link diagnostics as claimed in claim 10 wherein said digital signal processor comprises:

an analog to digital converter for converting said received pulse/pattern to a digital format; and a processor for processing said received pulse/pattern.

12. A fiber optic data link module with built-in link diagnostics as claimed in claim 1 wherein said diagnostic system further comprises:

a second multiplexer connected to an output of a receiver which would select between receiver decoded data and a count output from said register.

13. A method of performing link diagnostics on a fiber optic data link comprising the steps of:

connecting a diagnostic system to a fiber optic transmitter system;

raising a test mode select input to an enabled voltage;

sending a trigger pulse from a test controller to trigger a pulse/pattern generator to produce a pulse/pattern;

resetting a counter to begin counting;

monitoring with a pulse/pattern detector, a received signal for a received pulse/pattern;

sending a trigger to a register;

capturing at said register a current count; and transmitting said current count out of said diagnostic system, and further comprising the steps of:

inserting a multiplexer at an output of a receiver connected to said fiber optic transmitter system; and selecting by said multiplexer between decoded data of said receiver and a count output from said register.

14. A method of performing link diagnostics on a fiber optic data link as claimed in claim 13 further comprising the steps of:

changing a laser bias to a predetermined level; and gradually incrementing said laser bias until said received pulse/pattern is detected.

15. A fiber optic data link module with built-in link diagnostics, comprising:

a fiber optic transmitter system comprising:
an encoder;
a serializer connected to said encoder;
a phase-locked loop connected to said serializer;
a laser driver connected to said serializer;
a laser diode connected to said laser driver; and
a monitor photodiode connected to said laser driver; and a diagnostic system connected to said fiber optic transmitter system that uses said laser diode and said monitor photodiode from said fiber optic transmitter system to perform diagnostics by receiving digital data and by performing processing to detect a reflected test signal and to compute a roundtrip time of the reflected test signal to determine one of a fault location and a link length, wherein said diagnostic system comprises:

a multiplexer connected between said encoder and said serializer of said fiber optic transmitter system;

a counter connected to said phase locked loop of said fiber optic transmitter system;

a pulse/pattern generator connected to said phase locked loop and said multiplexer;

a normal op/test mode selector connected to said multiplexer;

a test controller connected to normal op/test mode selector, said counter and said pulse/pattern generator;

a register connected to said phase locked loop and said counter; and a pulse/pattern detector connected to said phase locked loop, said test controller and said monitor photodiode of said fiber optic transmitter system.

16. A fiber optic data link module with built-in link diagnostics as claimed in claim 15 wherein said diagnostic system further comprises:

a laser bias adjuster connected between said test controller and said laser driver of said fiber optic transmitter system.

17. A fiber optic data link module with built-in link diagnostics as claimed in claim 16 wherein said test controller comprises:

generation means for generating an initial trigger to reset said counter;

reset means for resetting said laser bias adjuster;

trigger means for triggering said pulse/pattern generator;

first monitor means for monitoring a count overflow from said counter;

second monitor means for monitoring a pattern found signal from pulse/pattern detection circuitry; and signal means for sending a signal for incrementing bias to said laser bias adjuster.

* * * * *